(12) United States Patent
Ishida et al.

(10) Patent No.: US 8,125,765 B2
(45) Date of Patent: Feb. 28, 2012

(54) LAMINATED CERAMIC ELECTRONIC COMPONENT

(75) Inventors: Atsushi Ishida, Echizen (JP); Takumi Taniguchi, Fukui (JP); Masaki Tani, Nyu-gun (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 167 days.

(21) Appl. No.: 12/759,807

(22) Filed: Apr. 14, 2010

(65) Prior Publication Data

US 2010/0271752 A1 Oct. 28, 2010

(30) Foreign Application Priority Data

Apr. 22, 2009 (JP) ................................. 2009-103773

(51) Int. Cl.
*H01G 4/06* (2006.01)

(52) U.S. Cl. .................. 361/321.2; 361/303; 361/306.1; 361/306.2; 361/321.1; 361/313

(58) Field of Classification Search ............... 361/321.2, 361/303, 305, 308.1, 309, 311–313, 306.1, 361/306.3

See application file for complete search history.

(56) References Cited

U.S. PATENT DOCUMENTS

| | | | | |
|---|---|---|---|---|
| 6,327,134 B1 * | 12/2001 | Kuroda et al. | ................. | 361/303 |
| 7,230,815 B2 * | 6/2007 | Yoon et al. | ..................... | 361/303 |
| 7,295,421 B2 * | 11/2007 | Mihara et al. | ............. | 361/308.1 |
| 7,428,135 B2 * | 9/2008 | Togashi et al. | ................. | 361/303 |
| 7,542,264 B2 * | 6/2009 | Oshima | ..................... | 361/306.3 |
| 7,990,677 B2 * | 8/2011 | Lee et al. | ................... | 361/306.3 |
| 2007/0064375 A1 | 3/2007 | Urashima et al. | | |

FOREIGN PATENT DOCUMENTS

| | | | |
|---|---|---|---|
| JP | 5-275269 | A | 10/1993 |
| JP | 7-30251 | A | 1/1995 |
| JP | 11-162781 | A | 6/1999 |
| JP | 11-340106 | A | 12/1999 |
| JP | 2000-235935 | A | 8/2000 |
| JP | 2000-331879 | A | 11/2000 |
| JP | 2002-151349 | A | 5/2002 |
| JP | 2004-047707 | A | 2/2004 |
| JP | 2004-103607 | A | 4/2004 |
| JP | 2004-153027 | A | 5/2004 |
| JP | 2004-303946 | A | 10/2004 |
| JP | 2005-340663 | A | 12/2005 |
| JP | 2007-096258 | A | 4/2007 |
| JP | 2007-266350 | A | 10/2007 |
| JP | 2008-283166 | A | 11/2008 |
| JP | 2009-004734 | A | 1/2009 |

OTHER PUBLICATIONS

Official Communication issued in corresponding Japanese Patent Application No. 2009-103773, mailed on Aug. 23, 2011.

* cited by examiner

*Primary Examiner* — Nguyen T Ha
(74) *Attorney, Agent, or Firm* — Keating & Bennett, LLP

(57) ABSTRACT

In a laminated ceramic electronic component including a ceramic element body including a plurality of effective sections, each of which constitutes a circuit element such as a laminated capacitor unit, bumps generated between the effective portions and a gap interposed between the effective portions can be made minimized. Specifically, the ceramic element body includes a first effective section including a first circuit element and a second effective section including a second circuit element. A gap is provided between the first and second effective section. Floating internal conductors are arranged in the gap at least in one of first and second external layer sections, the first external section being interposed between a first main surface and the first and second effective sections, and the second external layer section being interposed between a second main surface and the first and second effective sections.

11 Claims, 10 Drawing Sheets

LAMINATED CERAMIC ELECTRONIC COMPONENT

BACKGROUND OF THE INVENTION

1. Field of the Invention

The present invention relates to laminated ceramic electronic components such as laminated ceramic capacitors, ceramic multilayer substrates, and laminated ceramic thermistors, and particularly relates to a laminated ceramic electronic component including a ceramic element body including a plurality of effective sections which function as circuit elements, such as capacitor units, for example.

2. Description of the Related Art

In recent years, as electronic apparatuses become miniaturized, ceramic electronic components which are implemented on substrates of electronic apparatuses also have been miniaturized. Therefore, various array-type ceramic electronic components, each of which includes a single chip component having a plurality of functions of electronic components, have been proposed.

For example, Japanese Unexamined Patent Application Publication No. 2000-331879 discloses a laminated capacitor array 101 shown in FIG. 9. In the laminated capacitor array 101, first and second laminated capacitor units 103 and 104 are included in a ceramic sintered body 102. The first laminated capacitor unit 103 is configured such that first and second internal electrodes 105 and 106 shown in FIGS. 10A and 10B are laminated on one another through ceramic layers. The second laminated capacitor unit 104 is configured such that third and fourth internal electrodes 107 and 108 are laminated on one another through ceramic layers.

In the laminated capacitor array 101, first and second effective sections constituted by the first and second laminated capacitor units 103 and 104, respectively are included in the ceramic sintered body 102. Therefore, miniaturization is realized.

Note that the first and second laminated capacitor units 103 and 104 are arranged with a gap G interposed therebetween so that crosstalk between the two capacitor units 103 and 104 is prevented from being generated.

However, although the gap G does not include any internal electrodes, the laminated capacitor unit 103 includes internal electrodes 105 and 106 and the laminated capacitor unit 104 includes internal electrodes 107 and 108. Therefore, it is likely that bumps between portions in which the first and second laminated capacitor units 103 and 104 are arranged and a portion of the gap G are generated on upper and lower surfaces of the ceramic sintered body 102 due to thicknesses of the internal electrodes.

When the bumps are generated, smoothness of the upper and lower surfaces of the ceramic sintered body 102 is deteriorated. Therefore, when the laminated capacitor array 101 is to be implemented, the laminated capacitor array 101 may not be reliably sucked and picked up by a mounter.

To address such a problem, Japanese Unexamined Patent Application Publication No. 2004-153027 discloses a method for forming internal electrodes by printing conductive paste on a ceramic green sheet and thereafter printing ceramic paste in portions around the internal electrodes so that thicknesses of the internal electrodes are substantially equal to thicknesses of the portions around the internal electrodes. Accordingly, a problem of bumps between portions including the internal electrodes and portions around the portions including the internal electrodes is solved.

However, when the ceramic paste is to be printed on the portions around the portions including the internal electrodes formed of the conductive paste, the ceramic paste should be printed so as to reliably contact with the internal electrodes. Otherwise, gaps are generated between the internal electrodes and the ceramic paste. Therefore, the ceramic paste should be printed with considerably high accuracy, resulting in complicated fabrication steps and high fabrication cost.

Furthermore, organic binders included in the conductive paste used to form the internal electrodes may be soluble in solvent included in the ceramic paste, and therefore, shapes of the printed internal electrodes may be deformed. If the shapes of the printed internal electrodes are deformed, it is possible that a desired electric characteristic is not obtained or a structural defect occurs.

SUMMARY OF THE INVENTION

Accordingly, preferred embodiments of the present invention provide a laminated ceramic electronic component including a single ceramic element body including a plurality of effective sections which constitute circuit elements such as capacitor units, for example. In the laminated ceramic electronic component, bumps generated in the ceramic element body are minimized in size. Furthermore, the laminated ceramic electronic component is fabricated without the use of a high-accuracy printing technique but instead with comparatively simple steps, and therefore, is low in cost.

According to a preferred embodiment of the present invention, a laminated ceramic electronic component includes a ceramic element body including a plurality of laminated ceramic layers, first and second main surfaces which face each other, and first to fourth side surfaces which are connected to the first and second main surfaces, the first side surface facing the second side surface and the third side surface facing the fourth side surface, a first effective section which is disposed in the ceramic element body and which includes a first circuit element, a second effective section which is disposed adjacent to the first effective section with a gap interposed therebetween that is parallel or substantially parallel to the first and second main surfaces in the ceramic element body and which includes a second circuit element, first and second external terminal electrodes which are located on one of the first to fourth side surfaces of the ceramic element body and which are electrically connected to the first circuit element, third and fourth external terminal electrodes which are located on one of the first to fourth side surfaces of the ceramic element body and which are electrically connected to the second circuit element, and a floating internal conductor which is disposed in at least one of a first external layer section located between the first and second effective sections and the first main surface and a second external layer section located between the first and second effective sections and the second main surface, and which is not electrically connected to the first to fourth external terminal electrodes. The floating internal conductor is disposed in the gap when the ceramic element body is viewed from the first main surface.

The laminated ceramic electronic component may further include a plurality of the floating internal conductors which overlap with one another through ceramic layers. In this case, the bumps are effectively made smaller and minimized in size due to thicknesses of the plurality of floating internal conductors.

The first effective section may include first internal conductors electrically connected to the first external terminal electrode and second internal conductors electrically connected to the second external terminal electrode, the first and second internal conductors being laminated on one another through ceramic layers. The second effective section may include third internal conductors electrically connected to the third external terminal electrode and fourth internal conductors electrically connected to the fourth external terminal electrode, the third and fourth internal conductors being laminated on one another through ceramic layers. In this case, each of the effective units can be configured as a laminated circuit element such as a laminated capacitor unit, a laminated thermistor unit, a laminated inductor unit, or a laminated piezoelectric resonance unit, and miniaturization of electronic component can be enhanced.

The first and third external terminal electrodes may be provided on the first side surface, the second and fourth external electrodes may be provided on the second side surface, the first and second external terminal electrodes may face each other through the ceramic element body, and the third and fourth external electrodes may face each other through the ceramic element body. In this case, since the first side surface in which the first and third external terminal electrodes are arranged faces the second side surface in which the second and fourth external terminal electrodes which are connected to a potential different from a potential connected to the first and third external terminal electrodes are arranged, an operation of electrically connecting the laminated ceramic electronic component to an external device can be easily performed.

The first to fourth external terminal electrodes may have external terminal-electrode extending portions on the first and second main surfaces, and distances among centers of the external terminal-electrode extending portions of the first to fourth terminal electrodes adjacent to one another may be substantially equal to one another in each of the first and second main surfaces. In this case, direction determination of the laminated ceramic electronic component can be easily performed using the floating internal conductors as makers.

The first to fourth internal conductors may have internal conductor bodies and extending portions which are connected to the corresponding internal conductor bodies and each of which extends to a corresponding one of the first to fourth side surfaces of the ceramic element body so as to be electrically connected to a corresponding one of the first to fourth external terminal electrodes. The extending portions of the first and second internal conductors may be displaced toward the third side surface relative to a center of a portion in which the first and second internal conductor bodies overlap with one another, and the extending portions of the third and fourth internal conductors may be displaced toward the fourth side surface relative to a center of a portion in which the third and fourth internal conductor bodies overlap with one another. In this case, bumps generated between portions of the first and second effective sections and portions located outside the first and second effective sections and opposite to the other effective section can be made smaller.

The laminated ceramic electronic component may further include a dummy internal conductor which is electrically connected to one of the first to fourth external terminal electrodes in at least one of the first and second external layer sections. In this case, since the first and second internal conductors are exposed to the surfaces of the ceramic element body and electrically connected to the external terminal electrodes, joint strength of the external terminal electrodes can be enhanced. Furthermore, in a case where the external terminal electrodes are formed by a plating method, the number of starting points for plating is increased. Accordingly, the external terminal electrodes can be reliably and easily formed by the plating method.

The dummy internal conductor may be disposed on the same plane as the floating internal conductor. In this case, the dummy internal conductor and the floating internal conductor can be simultaneously formed on a ceramic green sheet in one printing step.

The laminated ceramic electronic component may further include first to fourth dummy internal conductors electrically connected to the first to fourth external terminal electrodes, respectively. A sum of lengths of the first and second dummy internal conductors and a sum of lengths of third and fourth dummy internal conductors may be equal to a length of the floating internal conductor. In this case, when a width of the floating internal conductor and widths of the first to fourth internal conductors are equal to one another, the dummy internal conductors and the floating internal conductor are formed only by printing internal conductors having the same size as the floating internal conductor on a mother ceramic green sheet in a grid like pattern.

The first and second internal conductors may extend to the same one of the side surfaces and may be electrically connected to first and second external terminal electrodes disposed on the same side surface, respectively. The third and fourth internal conductors may extend to the same one of the side surfaces and may be electrically connected to third and fourth external terminal electrodes disposed on the same side surface, respectively. In this case, in each of the first and second effective units, electric connection to an external device can be performed using one of the side surfaces of the ceramic element body.

A plurality of the floating internal conductors may be disposed on a plane in a certain vertical position in the ceramic element body. In this case, the plurality of floating internal conductors are formed in one printing step, and the bumps can be further made smaller due to presence of the plurality of floating internal conductors.

Accordingly, the first and second main surfaces of the ceramic element body can be made flat, and a sucking error of a mounter hardly occurs, for example.

Furthermore, the floating internal conductor can be easily formed by forming a dielectric film by printing conductive paste on a ceramic green sheet to be an external layer section or by a thin-film formation method such as plating or evaporation when the laminated ceramic electronic component 1 is fabricated. In addition, a printing method which requires high accuracy is not necessary. Accordingly, complicated fabrication steps of the laminated ceramic electronic component can be prevented and cost of the laminated ceramic electronic component can be reduced.

Other features, elements, characteristics and advantages of the present invention will become more apparent from the following detailed description of preferred embodiments of the present invention (with reference to the attached drawings).

DETAILED DESCRIPTION OF PREFERRED EMBODIMENTS

Preferred embodiments of the present invention will be described hereinafter with reference to the accompanying drawings.

Figure 1:
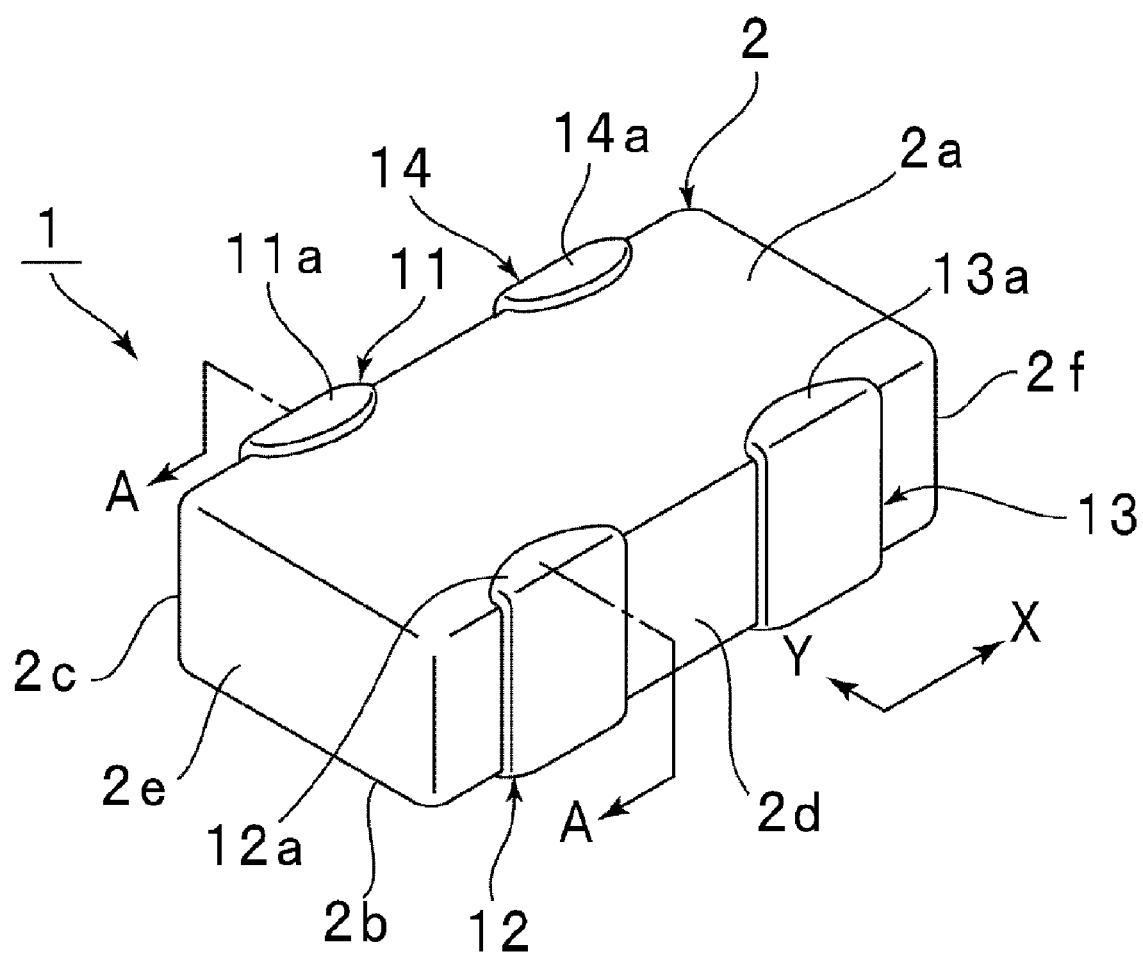
FIG. 1 is perspective view illustrating a laminated ceramic electronic component according to a first preferred embodiment of the present invention.

FIG. 1 is perspective view illustrating a laminated ceramic electronic component 1 according to a first preferred embodiment of the present invention. The laminated ceramic electronic component 1 of this preferred embodiment corresponds to a capacitor array.

The laminated ceramic electronic component 1 includes a ceramic element body 2 formed by laminating a plurality of ceramic layers and firing the laminated ceramic layers to provide a laminated body. The ceramic element body 2 has a substantially box shape and includes a first main surface 2a, a second main surface 2b which faces the first main surface 2a, and first to fourth side surfaces 2c to 2f which are connected to the first and second main surfaces 2a and 2b. The first and second side surfaces 2c and 2d face each other, and the third and fourth side surfaces 2e and 2f face each other.

It is assumed that a direction from the first side surface 2c to the second side surface 2d is determined to be a Y direction, and a direction from the third side surface 2e to the fourth side surface 2f is determined to be an X direction.

Figure 2:
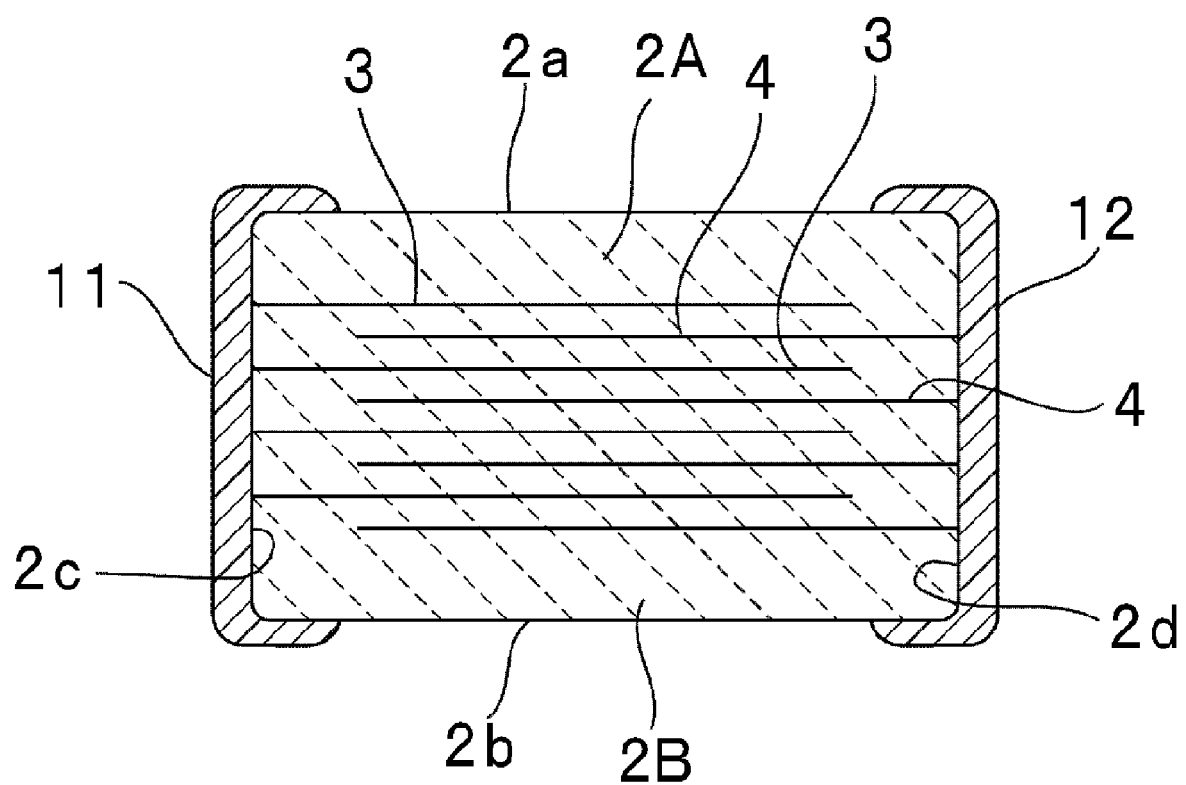
FIG. 2 is a sectional view taken along a line A to A of FIG. 1.
Figure 3:
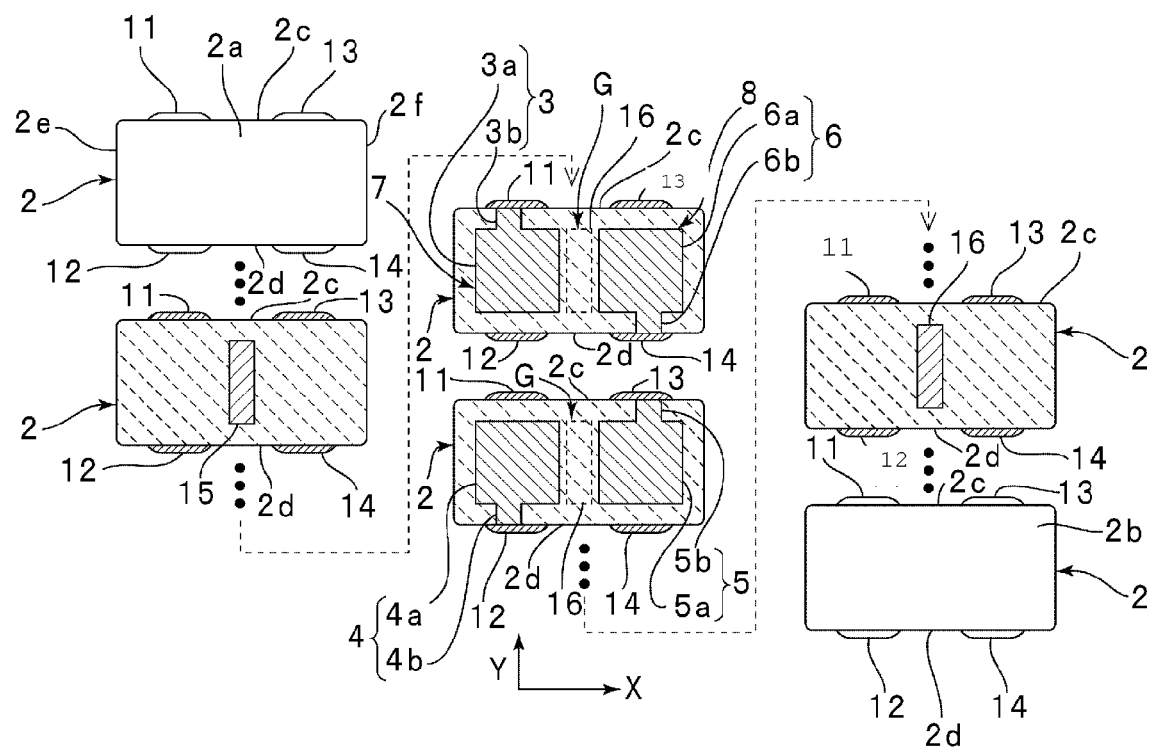
FIG. 3 is a horizontal sectional view schematically illustrating an electrode configuration in various vertical positions of the laminated ceramic electronic component according to the first preferred embodiment of the present invention.

FIG. 2 is a sectional view taken along a line A to A of the laminated ceramic electronic component 1 shown in FIG. 1. FIG. 3 is a horizontal sectional view schematically illustrating an electrode configuration in vertical positions in the laminated ceramic electronic component 1.

As shown in FIG. 2, in the ceramic element body 2, a plurality of first internal conductors 3 and a plurality of second internal conductors 4 are alternately laminated on one another so as to overlap with one another through ceramic layers. The first internal conductors 3 extend to the first side surface 2c, and the second internal conductors 4 extend to the second side surface 2d. As shown in FIG. 3, the first and second internal conductors 3 and 4 include respective rectangular internal conductor bodies 3a and 4a which overlap with one another through ceramic layers. Electrostatic capacitances are extracted from portions in which the internal conductor bodies 3a and the internal conductor bodies 4a overlap with one another through the ceramic layers.

The first and second internal conductors 3 and 4 include extending portions 3b and 4b which are connected to the first and second internal conductor bodies 3a and 4a, respectively. Each of the extending portions 3b has one terminal connected to a corresponding one of the internal conductor bodies 3a and the other terminal exposed to the first side surface 2c of the ceramic element body 2. Here, each of the extending portions 3b has a length in a direction from an end of the extending portion 3b connected to a corresponding one of the internal conductor body 3a of the first internal conductors 3 to the other end of the internal conductor body 3a near the first side surface 2c, and a width in a direction perpendicular to the length. Other extending portions, which will be described hereinafter, similarly have lengths in extending directions and widths in directions perpendicular to the lengths.

One terminal of each of the extending portions 4b is connected to a corresponding one of the internal conductor bodies 4a, and the other terminal of the extending portion 4b extends to the second side surface 2d.

First and second external terminal electrodes 11 and 12 are disposed on the first and second side surfaces 2c and 2d so as to be connected to the extending portions 3b and 4b, respectively.

Accordingly, in the ceramic element body 2, a single laminated capacitor unit including the first internal conductors 3, the second internal conductors 4, and the first and second external terminal electrodes 11 and 12 is configured as a first circuit element. A portion in which the first circuit element is disposed is determined as a first effective section 7.

Note that, in this preferred embodiment, the widths of the extending portions 3b and 4b are smaller than widths of the internal conductor bodies 3a and 4a in a direction along the width direction of the extending portions 3b and 4b. Therefore, since the widths of the extending portions 3b and 4b which are not included in the portions in which the electrostatic capacitances are to be extracted are made smaller, unnecessary conductive members can be eliminated.

Furthermore, centers of the widths of the extending portions 3b and 4b are displaced toward the third side surface 2e from a center of the portion in which the first and second internal conductors 3 and 4 overlap with one another. That is, the extending portions 3b and 4b are displaced toward the third side surface 2e by a distance shown in FIG. 3. By this, a bump generated due to differences between a thickness of the first effective section 7 in the ceramic element body 2 and a thickness of a portion in the ceramic element body 2 which are located near the third side surface 2e is made smaller.

Note that the centers of the widths of the extending portions 3b and 4b may match the centers of the internal conductor bodies 3a and 4a in the width direction.

In this preferred embodiment, in the ceramic element body 2, a second effective section 8 is disposed adjacent to the first effective section 7. The second effective section 8 includes a plurality of third internal conductors 5 and a plurality of fourth internal conductors 6 which are alternately laminated so as to overlap with one another through ceramic layers. The second effective section 8 is configured substantially similarly to the first effective section 7.

Specifically, each of the third internal conductors 5 includes an internal conductor body 5a and an extending portion 5b, and each of the fourth internal conductors 6 includes an internal conductor body 6a and an extending portion 6b. The extending portions 5b and 6b extend to the first and second side surfaces 2c and 2d, respectively. Furthermore, the internal conductor bodies 5a and 6a have substantially rectangular shapes and overlap with one another through ceramic layers.

Also in the second effective section 8, centers of the extending portions 5b and 6b in the width direction are displaced outward relative to centers of the internal conductor bodies 5a and 6a in the width direction. That is, the extending portions 5b and 6b are displaced toward the fourth side surface 2f. Accordingly, a bump generated due to a difference between a thickness of a portion of the ceramic element body 2 corresponding to the second effective section 8 and a thickness of a portion of the ceramic element body 2 nearer the fourth side surface 2f relative to the second effective section 8 can be made smaller.

The centers of the widths of the extending portions 5b and 6b are not necessarily displaced outward. The centers of the widths of the extending portions 5b and 6b may match the centers of the internal conductor bodies 5a and 6a in the width direction.

The extending portions 5b of the third internal conductors 5 extend to the first side surface 2c, and the extending portions 6b of the fourth internal conductors 6 extend to the second side surface 2d. A third external terminal electrode 13 disposed on the first side surface 2c is electrically connected to the extending portions 6b. Furthermore, a fourth external terminal electrode 14 disposed on the second side surface 2d is electrically connected to the extending portions 6b.

Note that, as shown in FIG. 3, the fourth internal conductors 6 may be disposed in a position in the same level in height as the first internal conductors 3, and the third internal conductors 5 may be disposed in a position in the same level in height as the second internal conductors 4.

As shown in FIG. 2, in the ceramic element body 2, a portion over the first effective section 7 and a portion beneath the first effective section 7 are determined to be first and second external layer sections 2A and 2B, respectively. The first and second external layer sections 2A and 2B also extend over and beneath the second effective section 8.

Furthermore, in the ceramic element body 2, a plurality of floating internal conductors 15 shown in FIG. 3 are disposed in the first external layer section 2A positioned over the first and second effective sections 7 and 8. Similarly, a plurality of floating internal conductors 16 are disposed in the second external layer section 2B. The floating internal conductors 15 and 16 are not electrically connected to the first to fourth external terminal electrodes 11 to 14, and disposed in the ceramic element body 2 as floating conductors.

Although the floating internal conductors 15 and 16 preferably have substantially strip shapes, for example, in this preferred embodiment, planar shapes thereof are not particularly limited.

The floating internal conductors 15 and 16 are disposed in the gap G interposed between the first and second effective sections 7 and 8 when the ceramic element body 2 is viewed from the first main surface 2a. In FIG. 3, portions in which the lower floating internal conductors 16 are disposed in the same vertical positions as one of the first internal conductors 3 and one of the second internal conductors 4 are denoted by dotted lines. As is apparent from the floating internal conductors 16 denoted by the dotted lines, the floating internal conductors 16 are disposed in the gap G interposed between a group of the first and second internal conductors 3 and 4 and a group of the third and fourth internal conductors 5 and 6.

In the laminated ceramic electronic component 1, the gap G is arranged so that crosstalk generated between the first and second effective sections 7 and 8 is reduced. Specifically, the first and second effective sections 7 and 8 are arranged with the gap G interposed therebetween in a direction along the third and fourth side surfaces 2e and 2f.

As described above, in known laminated ceramic electronic components, it is likely that bumps are generated on upper and lower surfaces of ceramic element bodies due to gaps G.

However, in this preferred embodiment, a thickness of the gap G of the ceramic element body 2 is large because of the plurality of laminated ceramic layers and the presence of the floating internal conductors 15 and 16. Therefore, in the first and second main surfaces 2a and 2b of the ceramic element body 2, bumps generated between the gap G and the portions in which the first and second effective sections 7 and 8 are disposed are made smaller.

In addition, since the extending portions 3b, 4b, 5b, and 6b are displaced outward in the direction along the third and fourth side surfaces 2e and 2f as described above in this preferred embodiment, bumps generated between regions in which the first and second effective sections 7 and 8 are disposed and regions located outside relative to the first and second effective sections 7 and 8 are also made smaller.

Accordingly, in a case where the ceramic element body 2 is sucked by a mounter, for example, a sucking error hardly occurs.

The laminated ceramic electronic component 1 may be fabricated by a known technique of integrally firing laminated ceramics. For example, first, a plurality of mother ceramic green sheets mainly formed of dielectric ceramic powder such as barium titanate series ceramics are provided. The first internal conductors 3 and the fourth internal conductors 6 are formed, for example, by screen printing using conductive paste on a first mother ceramic green sheet among the plurality of mother ceramic green sheets. Similarly, the second internal conductors 4 and the third internal conductors 5 are formed, for example, by screen printing using conductive paste on a second mother ceramic green sheet. Then, one of the floating internal conductors 15 or 16 is formed by screen printing using conductive paste on a third mother ceramic green sheet.

A plain mother green sheet is provided as a fourth mother green sheet.

An appropriate number of the first to fourth mother ceramic green sheets are laminated on one another so as to obtain the ceramic element body 2 whereby a mother laminated body is obtained. The mother laminated body is subjected to pressure bonding in a thickness direction. Thereafter, the mother laminated body is cut in the thickness direction in a unit of the laminated ceramic electronic component 1 so that laminated body raw chips are obtained. Each of the laminated body raw chips is fired so that the ceramic element body 2 is obtained.

The first and third external terminal electrodes 11 and 13 are provided on the first side surface 2c of the ceramic element body 2, and the second and fourth external terminal electrodes 12 and 14 are provided on the second side surface 2d of the ceramic element body 2.

An example of the conductive paste used to form the first to fourth internal conductors 3 to 6 and the floating internal conductors 15 and 16 include conductive paste mainly including appropriate metal powder such as Ag, Au, Pd, Ni, Cu, or an Ag—Pd alloy. Note that the internal conductors 3 to 6 may be formed by a method other than the screen printing using the conductive paste. That is, the internal conductors 3 to 6 and the floating internal conductors 15 and 16 may be formed on the ceramic green sheets using a thin-film formation method such as deposition or sputtering.

On the other hand, the first to fourth external terminal electrodes 11 to 14 are formed by applying the conductive paste to the ceramic element body 2 which has been fired and burning the conductive paste. In this case, each of the external terminal electrodes 11 to 14 preferably includes an electrode underlayer and a plated layer laminated on the electrode underlayer. The electrode underlayer may be formed by applying conductive paste to the ceramic element body 2 which has been fired and burning the conductive paste, or may be formed by applying conductive paste to the ceramic element body 2 which has not been fired and burning the conductive paste at a time of firing.

Furthermore, the electrode underlayer may be formed as a sintered metal layer or may be directly formed by a plating method. Alternatively, the electrode underlayer may be formed by applying conductive resin including thermosetting resin and hardening the conductive resin.

Furthermore, an example of the plating layer includes a plating film formed of an appropriate metal. Examples of the metal include Cu, Ni, Ag, Pd, an Ag—Pd alloy, or Au.

A plurality of the plating layers may be formed. Preferably, an Sn plating layer having an excellent soldering characteristic is formed on an outer surface.

Moreover, in a case where the electrode underlayer is formed of Ag which is likely to cause solder leaching, an Ni plating layer is preferably formed between the electrode underlayer and the outermost Sn plating layer.

In addition, a conductive resin layer may be laminated between the electrode underlayer and the plating layer so as to reduce stress.

Note that, in the laminated ceramic electronic component 1 of this preferred embodiment, positions of the floating internal conductors 15 and 16 formed in the first and second external layer sections 2A and 2B are preferably recognized when viewed from the first and second main surfaces 2a and 2b. Accordingly, the first and second external layer sections 2A and 2B preferably have translucency. In this case, the floating internal conductors 15 and 16 may be used as direction recognition marks when a direction of the laminated ceramic electronic component 1 is to be determined.

As shown in FIGS. 1 and 2, the first and second external terminal electrodes 11 and 12 are positioned on the first and second side surfaces 2c and 2d of the ceramic element body 2, respectively, and the first external terminal electrode 11 has terminal-electrode extending portions 11a and 11b which extend to the first and second main surfaces 2a and 2b, respectively, and the second external terminal electrode 12 has terminal-electrode extending portions 12a and 12b which extend to the first and second main surfaces 2a and 2b, respectively. Similarly, the third external terminal electrode 13 has terminal-electrode extending portions 13a and 13b which extend to the first and second main surfaces 2a and 2b, respectively, and the fourth external terminal electrode 14 has terminal-electrode extending portions 14a and 14b which extend to the first and second main surfaces 2a and 2b, respectively. Note that a number of the terminal-electrode extending portions which extend to the second main surface 2b are not shown.

Figure 8:
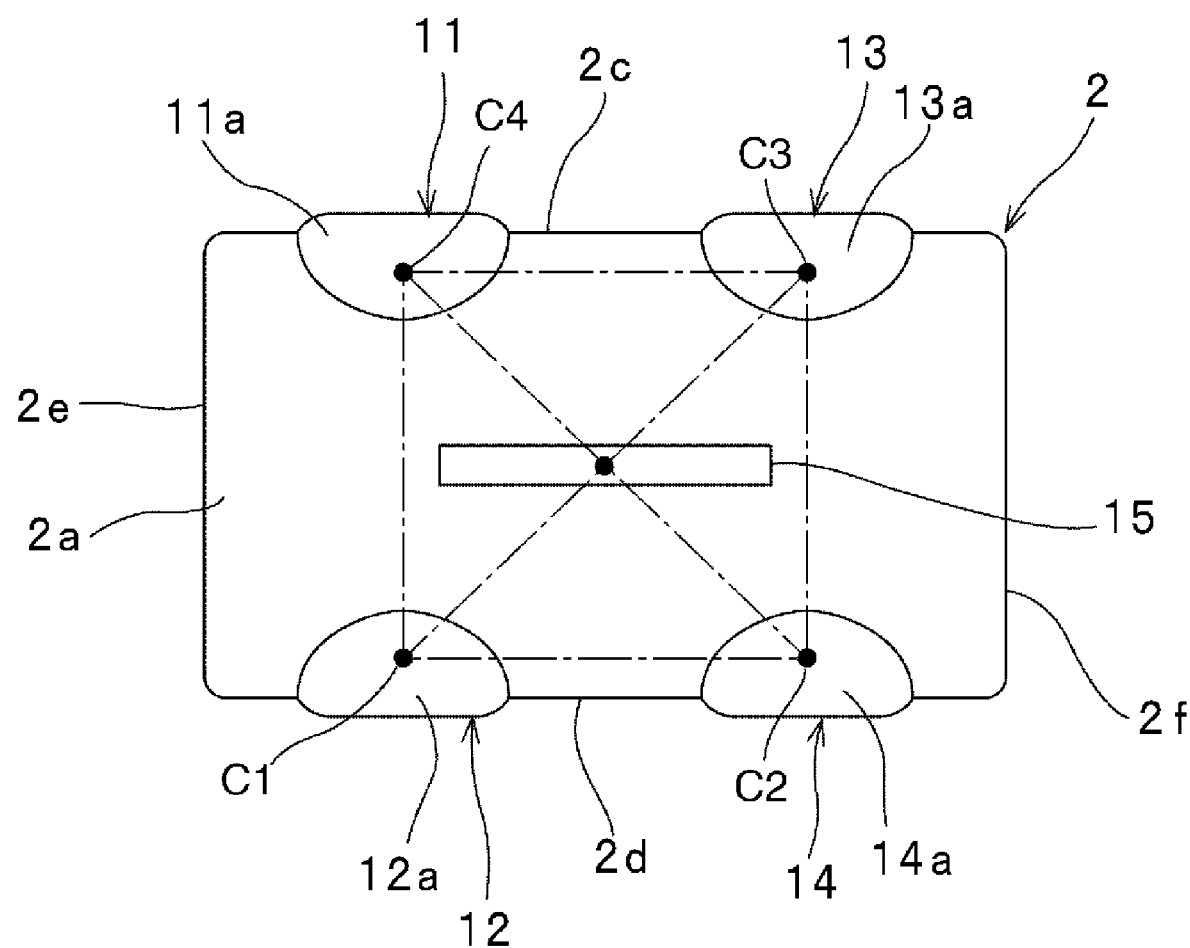
FIG. 8 is an enlarged plan view schematically illustrating the relationship among centers C1 to C4 of terminal-electrode extending portions of first to fourth external terminal electrodes in an example of a laminated capacitor according to various preferred embodiments of the present invention.
Figure 9:
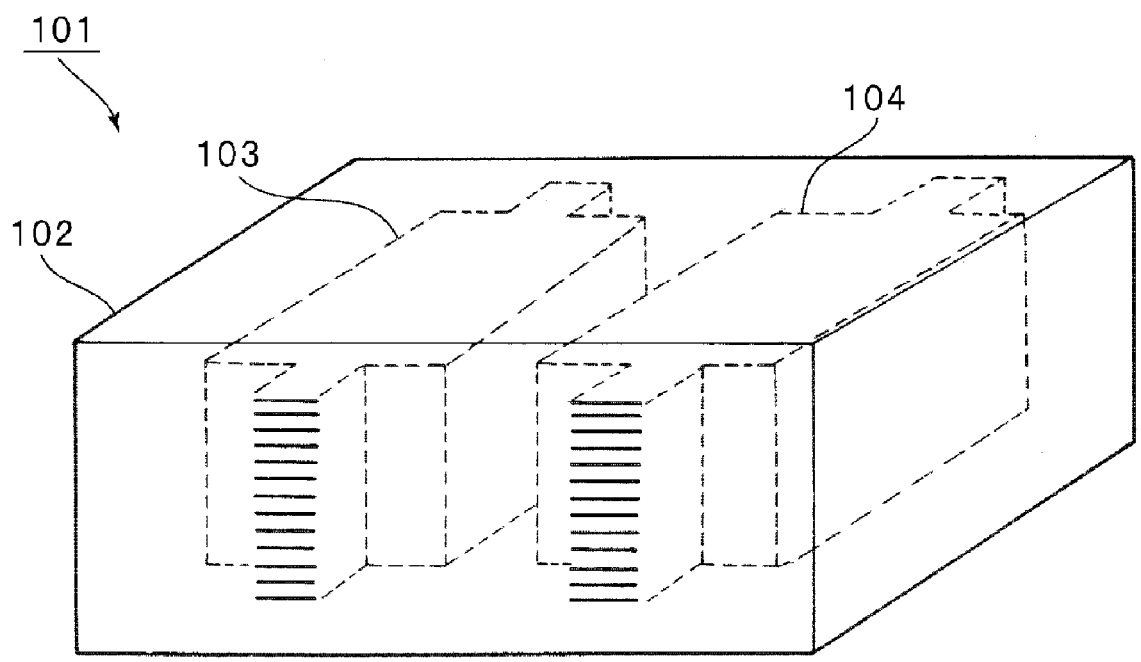
FIG. 9 is a perspective view schematically illustrating a known laminated capacitor array.
Figure 10A:
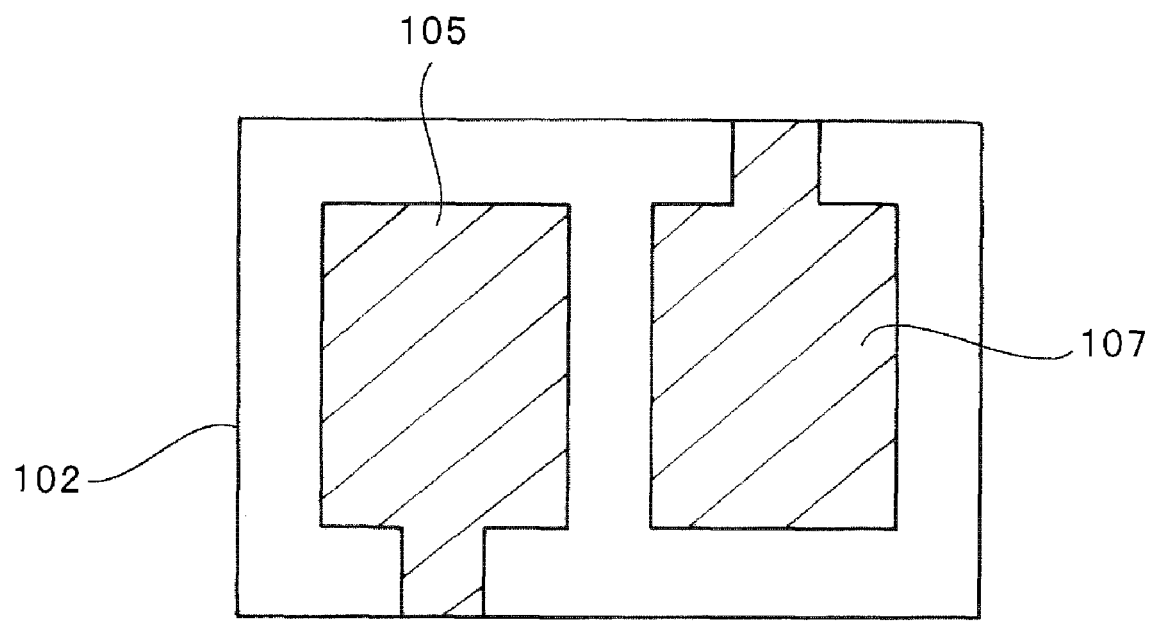
FIGS. 10A and 10B are horizontal sectional views illustrating shapes of internal electrodes of the known laminated capacitor array.
Figure 10B:
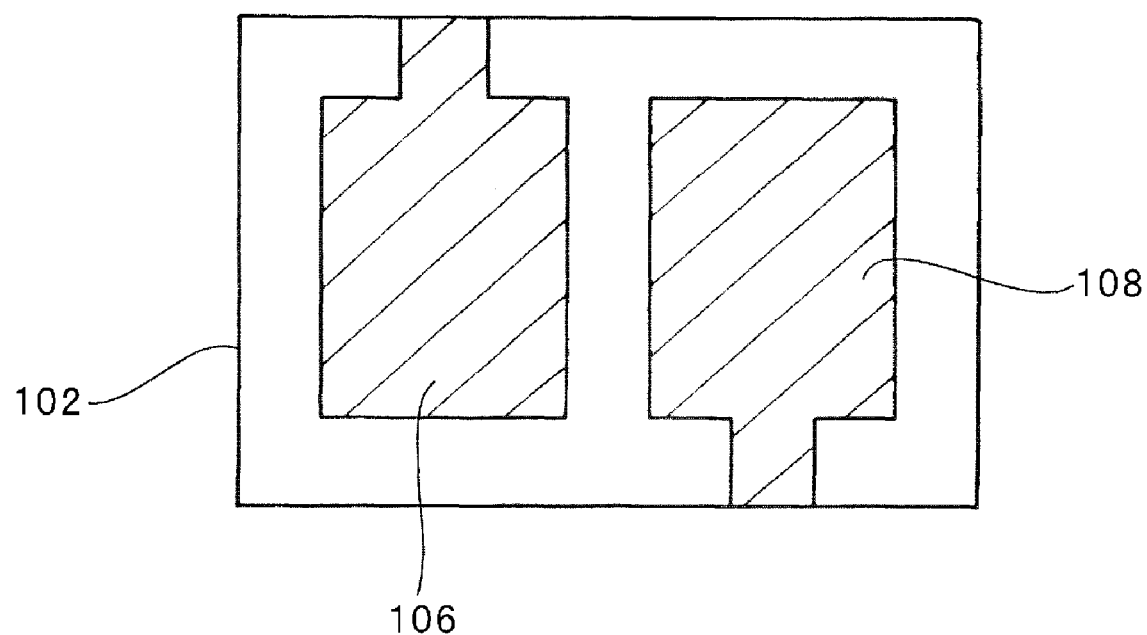

As described above, in the case where the floating internal conductors 15 and 16 are used as the direction recognition marks, as shown in an enlarged plan view in FIG. 8, on the first main surface 2a, the terminal-electrode extending portions 11a to 14a are preferably arranged so that distances among centers C1 to C4 of the terminal-electrode extending portions 11a to 14a adjacent to one another in an X direction and a Y direction are the same as one another. Similarly, on the second main surface 2b, the terminal-electrode extending portions 11b to 14b of the first to fourth external terminal electrodes 11 to 14 are preferably arranged so that distances among centers of the terminal-electrode extending portions 11b to 14b adjacent to one another in the X direction and the Y direction are the same as one another. Note that the term "centers" of the terminal-electrode extending portions corresponds to points positioned at the centers in the X and Y directions of the terminal-electrode extending portions when the terminal-electrode extending portions are viewed as a plan view, that is, viewed from the first main surface 2a.

As described above, in the case where the floating internal conductors 15 and 16 are used as the direction recognition marks, a direction is determined using an image pickup device such as a camera. When the first to fourth external terminal electrodes 11 to 14 are arranged as shown in FIG. 1, it is difficult to determine whether the first to fourth external terminal electrodes 11 to 14 are being in normal positions when viewed from the first main surface 2a or in positions rotated by 90 degrees relative to the normal positions. This is because, in image processing, a binary signal is obtained in accordance with a graphic which approximates a graphic obtained through photographing using the image pickup device.

Accordingly, a case where the terminal-electrode extending portions 11a to 14a are being in the normal positions and a case where the terminal-electrode extending portions 11a to 14a are being in the positions rotated by 90 degrees relative to the normal positions may not be distinguished.

Since the floating internal conductors 15 have substantially the strip shapes, a case where the floating internal conductors 15 are positioned as shown in FIG. 3 and a case where the floating internal conductors 15 are being in positions rotated by 90 degrees relative to the positions shown in FIG. 3 are apparently different from each other. Therefore, when distances among centers C1 to C4 of the external terminal-electrode extending portions of the first to fourth terminal electrodes adjacent to one another are substantially equal to one another, an inappropriate determination may be made as described above. However, when the floating internal conductors 15 are used for the direction determination, the direction determination is reliably performed.

Accordingly, to effectively perform the direction determination, it is preferable that the floating internal conductors 15 and 16 have substantially strip shapes having lengths and widths different from the lengths. The shapes of the floating internal conductors 15 and 16 are not limited and the floating internal conductors 15 and 16 may have substantially oval shapes. That is, the floating internal conductors 15 and 16 are preferably formed to have plane shapes having aspect ratios of equal to or larger than approximately 2 and equal to or smaller than approximately 20, for example.

If the floating internal conductors 15 and 16 have aspect ratios of smaller than approximately 2, it may be difficult to perform the direction determination, and if the floating internal conductors 15 and 16 have aspect ratios of larger than approximately 20, lengths are considerably large and widths are considerably small when the floating internal conductors 15 and 16 are arranged in limited regions, and accordingly, an effect of smaller bumps may not be sufficiently obtained.

Furthermore, the floating internal conductors 15 and 16 preferably have widths of approximately 5% to approximately 100% of a width of the gap G. If the widths of the floating internal conductors 15 and 16 are smaller than approximately 5% of the width of the gap G, an effect of smaller bumps may not be sufficiently obtained, and if the widths of the floating internal conductors 15 and 16 are larger than approximately 100%, the widths of the floating internal conductors 15 and 16 become larger than that of the gap G.

Note that the term "widths" corresponds to sizes of the floating internal conductors 15 and 16 in a direction from the first effective section 7 to the second effective section 8.

Note that the floating internal conductors 15 and 16 are disposed on the first and second external layer sections 2A and 2B. However, the floating internal conductors 15 and 16 may be disposed one of the first and second external layer sections 2A and 2B. In order to enhance the effect of smaller bumps, the floating internal conductors 15 and 16 are preferably disposed on both of the first and second external layer sections 2A and 2B.

Furthermore, the floating internal conductors 15 and 16 should be disposed in the gap G. The floating internal conductors 15 and 16 preferably do not extend to the effective sections so that undesired floating capacitances are prevented from being generated.

Moreover, the floating internal conductors 15 and 16 are not disposed in a vertical position in which the first and second effective sections 7 and 8 are disposed. That is, the floating internal conductors 15 and 16 are not disposed in the same plane as the internal conductors 3 to 6. If the floating internal conductors 15 and 16 are disposed, for example, in a vertical position in which the first internal conductors 3 and the fourth internal conductors 6 are disposed, the first internal conductors 3, the floating internal conductors in the gap G, the fourth internal conductors 6 are arranged with small intervals therebetween. Therefore, printed shapes may be deformed, or the first internal conductors 3 and the fourth internal conductors 6 may be electrically connected to each other.

Note that, although only one of the floating internal conductors 15 and only one of the floating internal conductors 16 are shown in FIG. 3, the plurality of floating internal conductors 15 and the plurality of floating internal conductors 16 are laminated in this preferred embodiment as described above. Since the plurality of floating internal conductors 15 and the plurality of floating internal conductors 16 are laminated as described above, the effect of smaller bumps can be enhanced. However, a floating internal conductor 15 in a single layer and a floating internal conductor 16 in a single layer may be disposed.

When the floating internal conductors 15 and 16 are used as the direction recognition marks, the floating internal conductors 15 and 16 are preferably arranged so as to overlap with intersections of diagonal lines formed by connecting the centers of pairs of the external terminal electrodes diagonally arranged. When the floating internal conductors 15 and 16 are arranged so as to overlap with the intersections of the diagonal lines, a field of view of the image pickup device such as a camera is easily positioned at the center of the ceramic element body 2, and a direction is recognized by determining whether the floating internal conductors 15 and 16 extend in the X direction or the Y direction.

Figure 4:
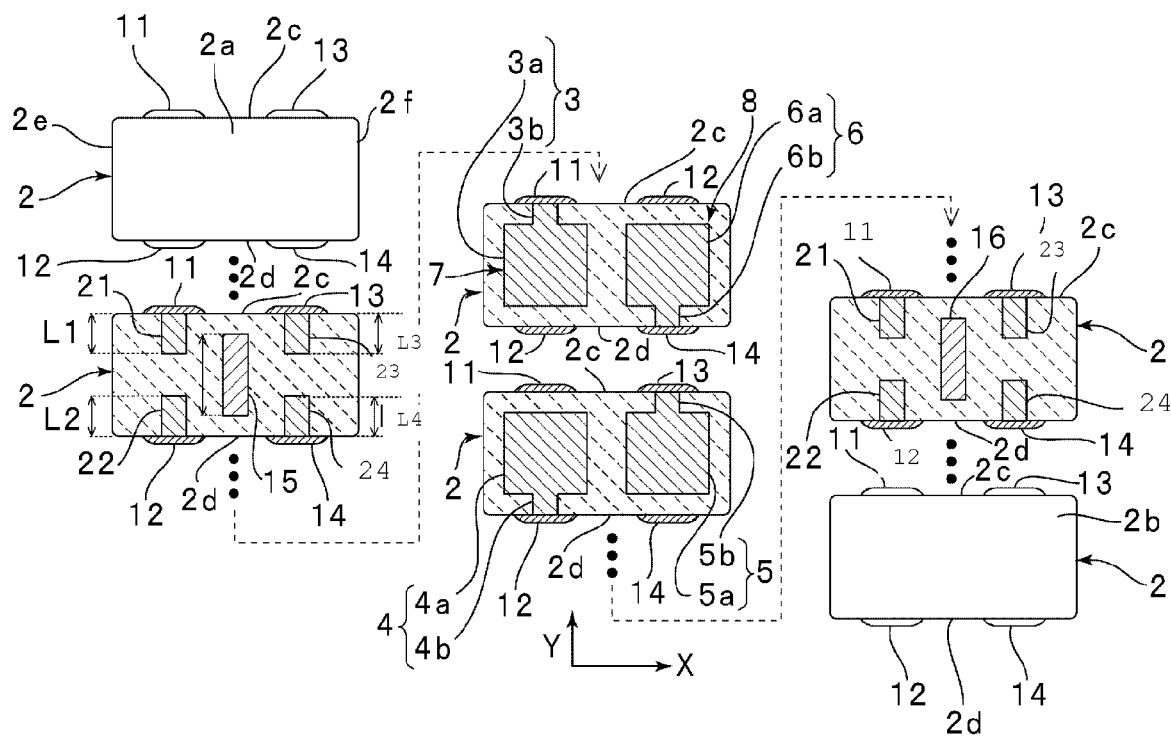
FIG. 4 is a horizontal sectional view schematically illustrating an electrode configuration in vertical positions of a laminated ceramic electronic component according to a second preferred embodiment of the present invention.
Figure 5:
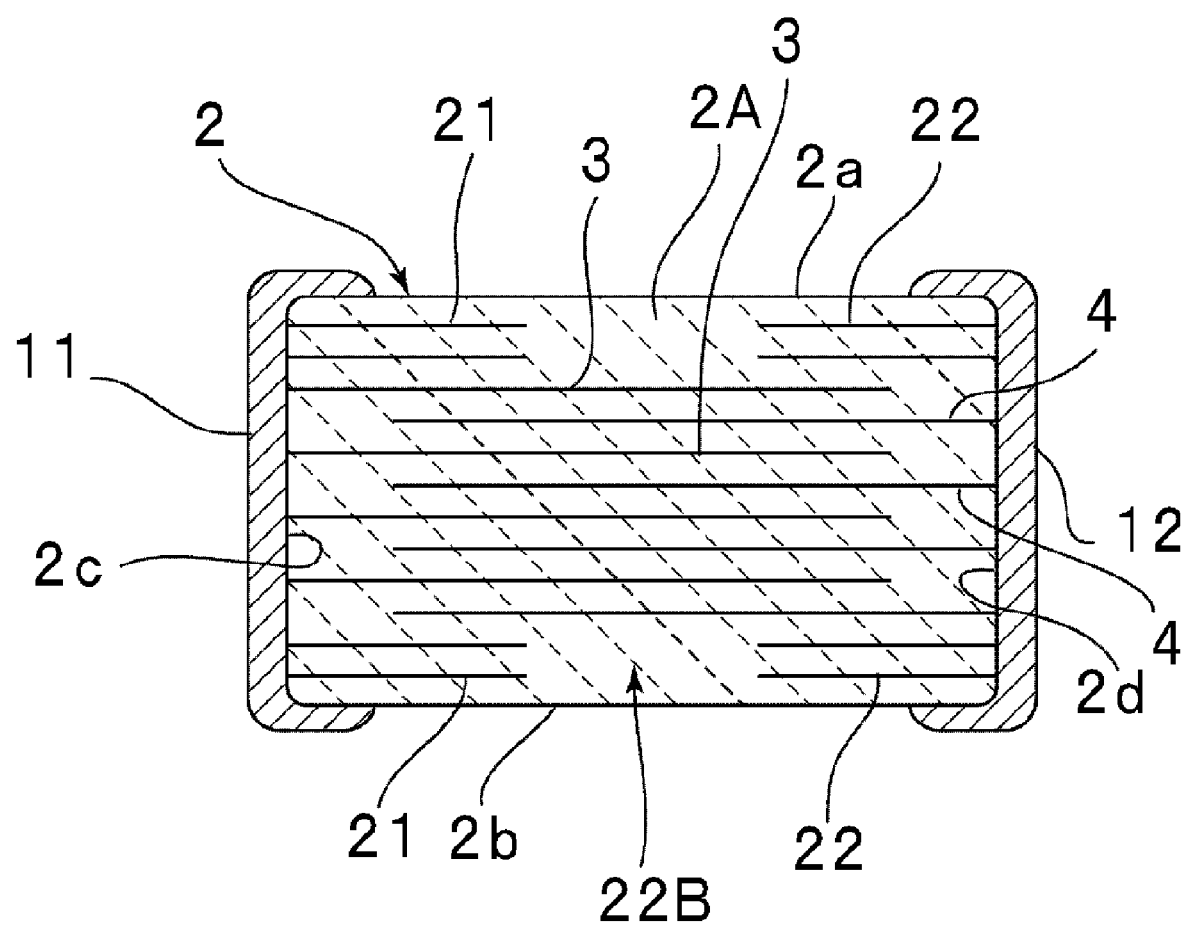
FIG. 5 is a vertical sectional view schematically illustrating an electrode configuration of a first effective section of the laminated ceramic electronic component according to the second preferred embodiment of the present invention.

FIGS. 4 and 5 are a horizontal sectional view and a vertical sectional view, respectively, schematically illustrating a laminated ceramic electronic component according to a second preferred embodiment of the present invention. As shown in FIG. 4, as with the first preferred embodiment, a ceramic element body 2 includes first to fourth internal conductors 3 to 6 also in the second preferred embodiment. Furthermore, as with the first preferred embodiment, first to fourth external terminal electrodes 11 to 14 are disposed. The second preferred embodiment is different from the first preferred embodiment in that, firstly, centers of extending portions 3b to 6b in a width direction match centers of internal conductor bodies 3a to 6a. As described above, it is not necessarily the case that the centers of the extending portions 3b to 6b are displaced outward in the X direction.

Secondary, in this preferred embodiment, first to fourth dummy internal conductors 21 to 24 are disposed in the same vertical positions as floating internal conductors 15 and 16.

FIG. 5 is a vertical sectional view schematically illustrating a portion in which a first effective section 7 is disposed. As is apparent from FIG. 5, the plurality of first dummy internal conductors 21 and the plurality of second dummy internal conductors 22 are disposed in a first external layer section 2A. Similarly, the plurality of first dummy internal conductors 21 and the plurality of second dummy internal conductors 22 are disposed in a second external layer section 2B.

The first dummy internal conductors 21 have substantially strip shapes and extend in a Y direction. First ends of the first dummy internal conductors 21 and first ends of the second dummy internal conductors 22 face one another in the Y direction with a gap disposed therebetween. Second ends of the first dummy internal conductors 21 extend to a first side surface 2c, and are electrically connected to the first external terminal electrode 11. Similarly, second ends of the second dummy internal conductors 22 extend to a second side surface 2d, and are electrically connected to the second external terminal electrode 12.

The third and fourth dummy internal conductors 23 and 24 are disposed in a second effective section 8. The third and fourth dummy internal conductors 23 and 24 are configured similarly to the first and second dummy internal conductors 21 and 22 disposed in the first effective section 7.

As described in this preferred embodiment, the first and second dummy internal conductors 21 and 22 and the third and fourth dummy internal conductors 23 and 24 may be disposed in the first and second external layer sections 2A and 2B which are located outside the first and second effective sections 7 and 8. The first to fourth dummy internal conductors 21 to 24 are electrically connected to the first to fourth external terminal electrodes 11 to 14, respectively. Accordingly, the number of portions connected to the first to fourth external terminal electrodes 11 to 14 is increased, and therefore, joint strength between the first to fourth external terminal electrodes 11 to 14 and the ceramic element body 2 is enhanced.

Furthermore, since the first to fourth dummy internal conductors 21 to 24 are incorporated, strength of the ceramic element body 2 is enhanced.

Moreover, in the method of forming the first to fourth external terminal electrodes 11 to 14 described above, when electrode underlayers of the first to fourth external terminal electrodes 11 to 14 are formed by a plating method, not only the internal conductors 3 to 6 but also portions in which the first to fourth dummy internal conductors 21 to 24 are exposed serve as starting points of plating. Accordingly, the electrode underlayers can be easily and reliably formed by the plating method.

Note that, since growth of plating has isotropy, the extending portions 3b to 6b extend to the first and second side surfaces 2c and 2d at the centers of regions in which the first to fourth external terminal electrodes 11 to 14 are formed. Accordingly, unlike the first preferred embodiment, the extending portions 3b to 6b are not displaced outward in the X direction.

Note that the first and second dummy internal conductors 21 and 22 and the third and fourth dummy internal conductors 23 and 24 may be disposed only in the first external layer section 2A, or only in the second external layer section 2B. Preferably, the plurality of first dummy internal conductors 21 are laminated on one another through ceramic layers and the plurality of second dummy internal conductors 22 are laminated on one another through ceramic layers as shown in this preferred embodiment, and the third and fourth dummy internal conductors 23 and 24 are similarly configured. However, only a single first dummy internal conductor 21, a single second dummy internal conductor 22, a single dummy internal conductor 23, and a single dummy internal conductor 24 may be formed in each of the first and second external layer sections 2A and 2B.

Furthermore, preferably, in the first to fourth dummy internal conductors 21 and 24, a sum of lengths L1 and L2 of the first and second dummy internal conductors 21 and 22 and a sum of lengths L3 and L4 of the third and fourth dummy internal conductors 23 and 24 are the same as lengths of the floating internal conductors 15 and 16. Note that the lengths L1 to L4 and the lengths of the floating internal conductors 15 and 16 extend in the Y direction.

In the case where the sum of lengths L1 and L2 of the first and second dummy internal conductors 21 and 22 and the sum of lengths L3 and L4 of the third and fourth dummy internal conductors 23 and 24 are the same as lengths of the floating internal conductors 15 and 16, widths of the first to fourth dummy internal conductors 21 to 24 and the floating internal conductors 15 and 16 are the same as one another. In this case, when strip-shape conductors having lengths and widths the same as those of the floating internal conductors 15 and 16 are printed in a grid like pattern on mother ceramic green sheets and laminated body chips in a unit of a laminated ceramic electronic component are obtained by cutting, the first and second dummy internal conductors 21 and 22 and the third and fourth dummy internal conductors 23 and 24 are positioned adjacent to the floating internal conductors 15 or the floating internal conductors 16. Accordingly, simple fabrication steps are realized.

Figure 6A:
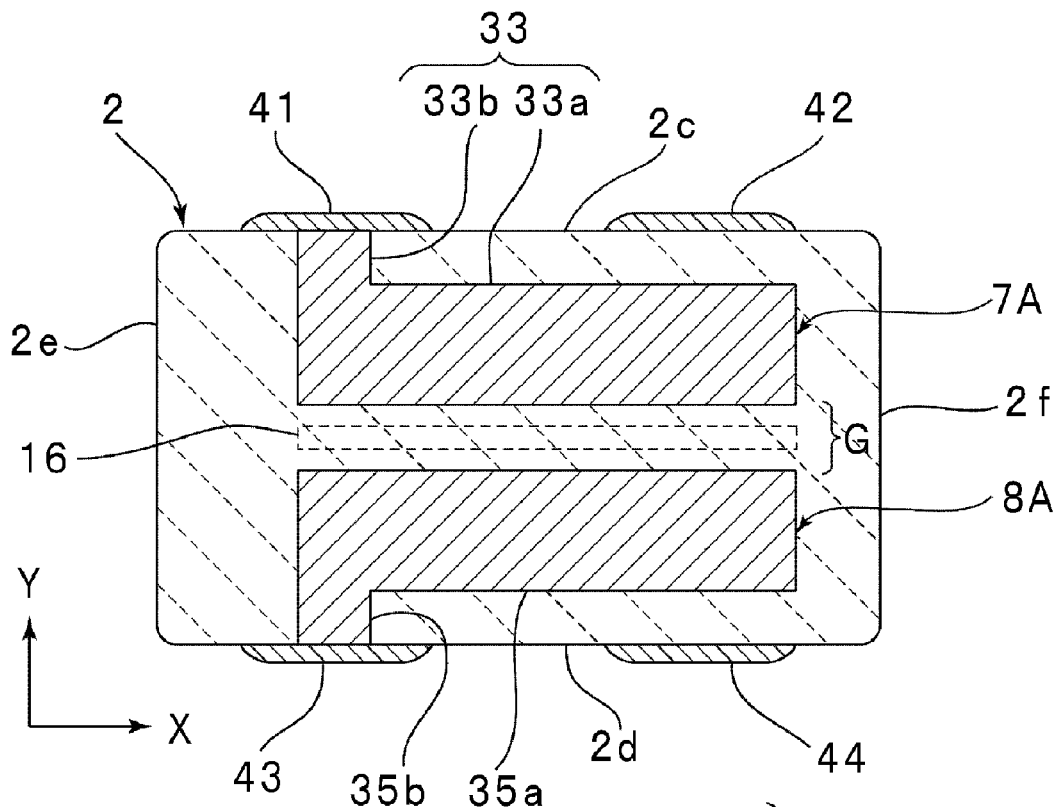
FIGS. 6A and 6B are horizontal sectional views schematically illustrating shapes of internal conductors included in a laminated ceramic electronic component according to a third preferred embodiment of the present invention.
Figure 6B:
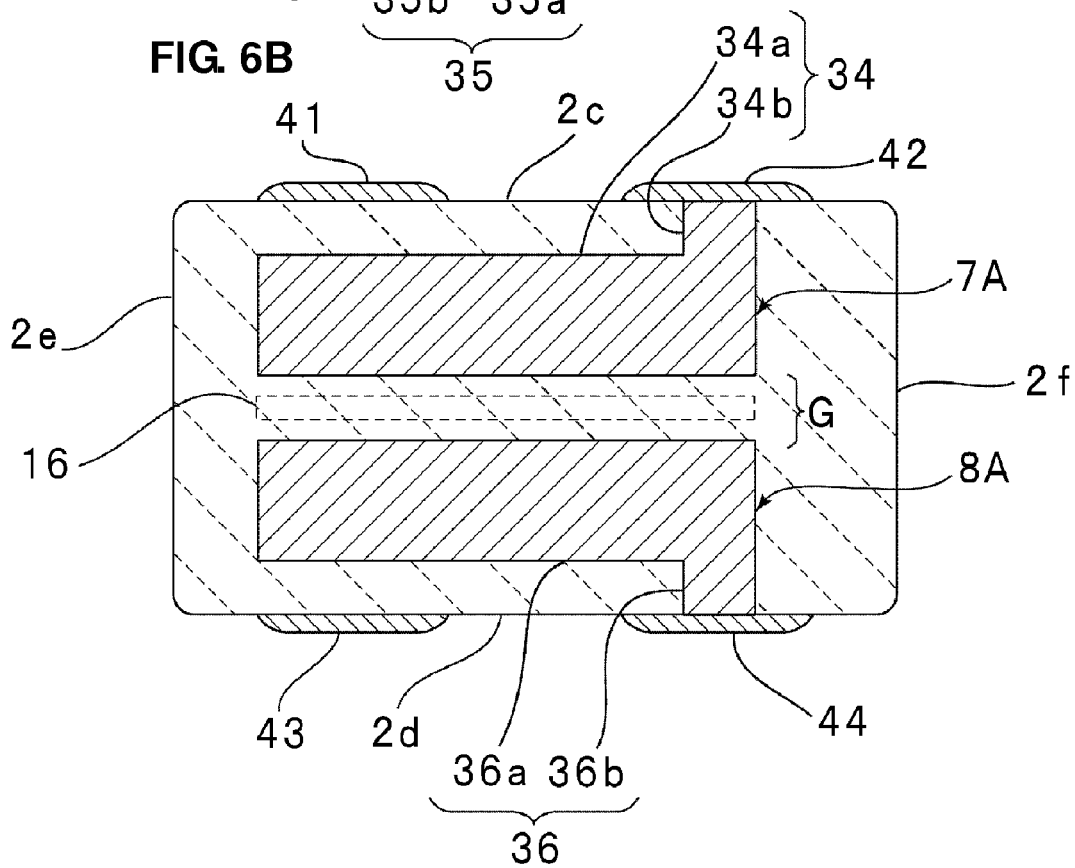

FIGS. 6A and 6B are horizontal sectional views schematically illustrating a modification of the laminated ceramic electronic component 1 of the first preferred embodiment. In the first preferred embodiment, the first and second effective sections 7 and 8 are arranged in the X direction and are separated from each other with the gap G interposed therebetween. However, in a laminated ceramic electronic component 30 of this preferred embodiment, first and second effective sections 7A and 8A are arranged in a Y direction and are separated from each other with a gap G interposed therebetween. Note that the first effective section 7A is formed by laminating first and second internal conductors 33 and 34. Extending portions 33b and 34b are formed so as to be connected to internal conductor bodies 33a and 34a of the internal conductors 33 and 34, respectively. The extending portions 33b and 34b extend to a first side surface 2c.

On the other hand, internal conductor bodies 35a and 36a of third and fourth internal conductors 35 and 36 have substantially rectangular shapes and overlap with one another through ceramic layers. Extending portions 35b and 36b extend to a second side surface 2d.

Then, first and second external terminal electrodes 41 and 42 are formed on the first side surface 2c, and third and fourth external terminal electrodes 43 and 44 are formed on the second side surface 2d. Accordingly, the first and second internal conductors 33 and 34 extend to the first side surface 2c and the first and second external terminal electrodes 41 and 42 are also disposed on the first side surface 2c.

Furthermore, the third and fourth internal conductors 35 and 36 extend to the second side surface 2d, and are connected to the third and fourth external terminal electrodes 43 and 44, respectively, on the second side surface 2d.

As described above, the first and second effective sections 7A and 8A may be arranged in the Y direction with the gap G interposed therebetween. Note that, also in this modification, floating internal conductors 16A are disposed on the gap G. Although not shown in FIG. 6, floating internal conductors are disposed also in a first external layer section in the gap G.

Figure 7:
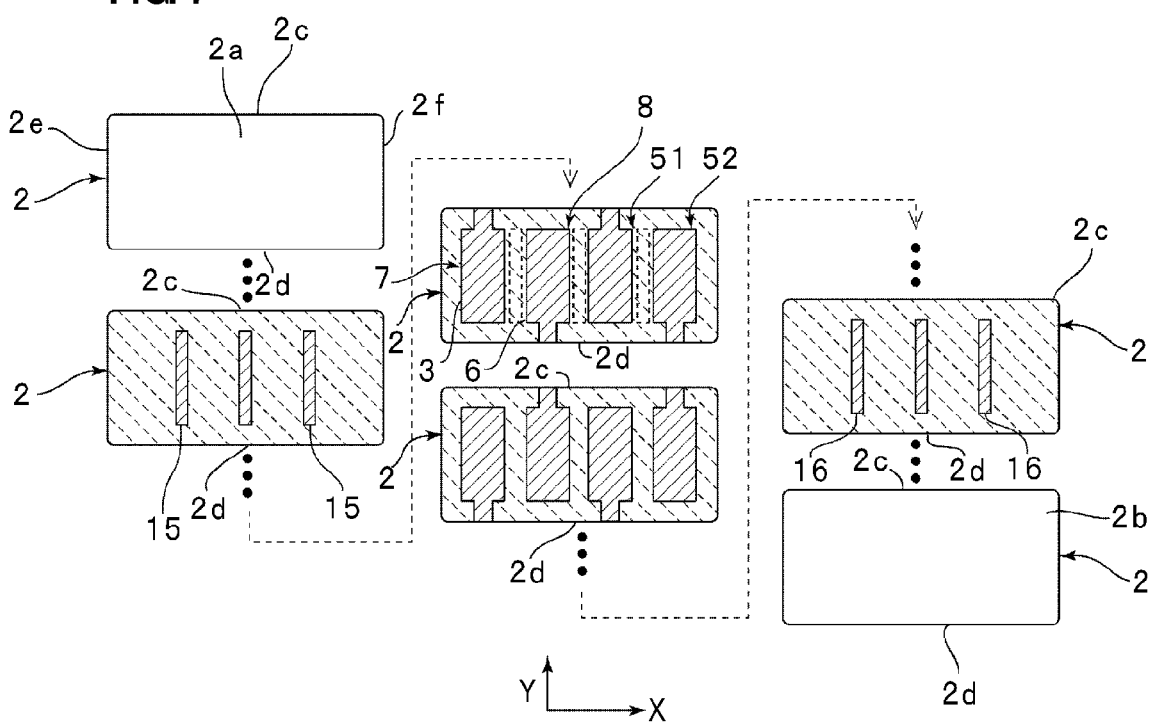
FIG. 7 is a horizontal sectional view schematically illustrating an electrode configuration in vertical positions of a laminated ceramic electronic component according to a fourth preferred embodiment of the present invention.

FIG. 7 is a horizontal sectional view schematically illustrating another modification of the laminated ceramic electronic component 1 of the first preferred embodiment. In the first preferred embodiment, the first and second effective sections 7 and 8 are arranged in the X direction. However, in the modification shown in FIG. 7, third and fourth effective sections 51 and 52 are located outside first and second effective sections 7 and 8 in an X direction. The third and fourth effective sections 51 and 52 are configured similarly to the first and second effective sections 7 and 8. Furthermore, floating internal conductors 15 and 16 are disposed in gaps G interposed between the first effective section 7 and the second effective section 8, between the second effective section 8 and the third effective section 51, and between the third effective section 51 and the fourth effective section 52.

In this way, according to this preferred embodiment, in addition to the first and second effective sections 7 and 8, one or more effective section may be arranged in the X direction.

Note that in the first and second preferred embodiments and the modifications described above, the plurality of internal conductors are laminated on one another through the ceramic layers in the first and second effective sections 7 and 8 and the first and second effective sections 7A and 8A so as to constitute laminated capacitor units. However, the present invention is applicable to various laminated ceramic electronic components by selecting ceramics to be used, or by appropriately changing shapes of internal conductors. For example, a laminated ceramic thermistor unit may be configured as a circuit element when ceramics having a positive or negative resistance temperature characteristic are used for ceramic layers to be interposed between internal conductors. Furthermore, a laminated inductor unit may be configured as a circuit element when magnetic ceramics are used for the ceramic layers. Moreover, a piezoelectric ceramic component used as a resonator or a filter may be configured when dielectric ceramic layers are used for the ceramic layers disposed between the internal conductors.

In addition, a laminated inductor may be obtained when internal conductors having substantially meander shapes or internal conductors having substantially spiral shapes, for example, are used instead of internal conductors having substantially planar shapes.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A laminated ceramic electronic component comprising:
a ceramic element body including a plurality of laminated ceramic layers, first and second main surfaces which face each other, and first to fourth side surfaces which are connected to the first and second main surfaces, the first side surface facing the second side surface and the third side surface facing the fourth side surface;
a first effective section which is disposed in the ceramic element body and which includes a first circuit element;
a second effective section which is disposed adjacent to the first effective section with a gap interposed therebetween parallel or substantially parallel to the first and second main surfaces in the ceramic element body and which includes a second circuit element;

first and second external terminal electrodes which are located on one of the first to fourth side surfaces of the ceramic element body and which are electrically connected to the first circuit element;

third and fourth external terminal electrodes which are located on one of the first to fourth side surfaces of the ceramic element body and which are electrically connected to the second circuit element; and a floating internal conductor which is disposed in at least one of a first external layer section located between the first and second effective sections and the first main surface and a second external layer section located between the first and second effective sections and the second main surface, and which is not electrically connected to the first to fourth external terminal electrodes; wherein the floating internal conductor is disposed in the gap when the ceramic element body is viewed from the first main surface.

2. The laminated ceramic electronic component according to claim 1, further comprising a plurality of the floating internal conductors which overlap with one another through ceramic layers.

3. The laminated ceramic electronic component according to claim 1, wherein the first effective section includes first internal conductors electrically connected to the first external terminal electrode and second internal conductors electrically connected to the second external terminal electrode, the first and second internal conductors being laminated on one another through ceramic layers, and the second effective section includes third internal conductors electrically connected to the third external terminal electrode and fourth internal conductors electrically connected to the fourth external terminal electrode, the third and fourth internal conductors being laminated on one another through ceramic layers.

4. The laminated ceramic electronic component according to claim 3, wherein the first and third external terminal electrodes are located on the first side surface, the second and fourth external electrodes are located on the second side surface, the first and second external terminal electrodes face each other through the ceramic element body, and the third and fourth external electrodes face each other through the ceramic element body.

5. The laminated ceramic electronic component according to claim 4, wherein the first to fourth external terminal electrodes include external terminal-electrode extending portions on the first and second main surfaces, and distances among centers of the external terminal-electrode extending portions of the first to fourth terminal electrodes adjacent to one another are substantially equal to one another in each of the first and second main surfaces.

6. The laminated ceramic electronic component according to claim 3, wherein the first to fourth internal conductors include internal conductor bodies and extending portions which are connected to the corresponding internal conductor bodies and each of which extends to a corresponding one of the first to fourth side surfaces of the ceramic element body so as to be electrically connected to a corresponding one of the first to fourth external terminal electrodes, and the extending portions of the first and second internal conductors are displaced toward the third side surface relative to a center of a portion in which the first and second internal conductor bodies overlap with one another, and the extending portions of the third and fourth internal conductors are displaced toward the fourth side surface relative to a center of a portion in which the third and fourth internal conductor bodies overlap with one another.

7. The laminated ceramic electronic component according to claim 3, wherein the first and second internal conductors extend to the same one of the side surfaces and are electrically connected to first and second external terminal electrodes disposed on the same side surface, respectively, and the third and fourth internal conductors extend to the same one of the side surfaces and are electrically connected to third and fourth external terminal electrodes disposed on the same side surface, respectively.

8. The laminated ceramic electronic component according to claim 1, further comprising a dummy internal conductor which is electrically connected to one of the first to fourth external terminal electrodes at least in one of the first and second external layer sections.

9. The laminated ceramic electronic component according to claim 8, wherein the dummy internal conductor is disposed on a same plane as the floating internal conductor.

10. The laminated ceramic electronic component according to claim 8, further comprising first to fourth dummy internal conductors electrically connected to the first to fourth external terminal electrodes, respectively, wherein a sum of lengths of the first and second dummy internal conductors and a sum of lengths of third and fourth dummy internal conductors are equal to a length of the floating internal conductor.

11. The laminated ceramic electronic component according to claim 1, wherein a plurality of the floating internal conductors are disposed on a plane in a certain vertical position in the ceramic element body.

* * * * *